(12) United States Patent
Parlak et al.

(10) Patent No.: US 11,580,222 B2
(45) Date of Patent: Feb. 14, 2023

(54) AUTOMATED MALWARE ANALYSIS THAT AUTOMATICALLY CLUSTERS SANDBOX REPORTS OF SIMILAR MALWARE SAMPLES

(71) Applicant: Siemens Aktiengesellschaft, Munich (DE)

(72) Inventors: Ayse Parlak, Princeton, NJ (US); Enrico Lovat, Princeton, NJ (US); Tobias Mainka, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 514 days.

(21) Appl. No.: 16/679,765

(22) Filed: Nov. 11, 2019

(65) Prior Publication Data

US 2020/0159925 A1    May 21, 2020

Related U.S. Application Data (60) Provisional application No. 62/769,604, filed on Nov. 20, 2018.

(51) Int. Cl.
| | |
|---|---|
| *G06F 21/56* | (2013.01) |
| *G06N 3/04* | (2023.01) |
| *G06N 7/00* | (2023.01) |
| *G06F 9/54* | (2006.01) |
| *G06F 21/53* | (2013.01) |

(Continued)

(52) U.S. Cl.
CPC ............. *G06F 21/566* (2013.01); *G06F 9/54* (2013.01); *G06F 21/53* (2013.01); *G06F 40/242* (2020.01); *G06F 40/284* (2020.01); *G06N 3/04* (2013.01); *G06N 7/005* (2013.01); *G06F 2221/033* (2013.01)

(58) Field of Classification Search
CPC .. G06F 3/1219; G06F 3/1234; B41J 2/04501; B41J 2/0458; B41J 29/393; G11C 16/102; G11C 16/12; G11C 16/3422
See application file for complete search history.

(56) References Cited

U.S. PATENT DOCUMENTS

| | | | |
|---|---|---|---|
| 10,546,143 B1 * | 1/2020 | Wesson | G06F 16/17 |
| 2011/0064308 A1 * | 3/2011 | Stein | G06V 10/60 |
| | | | 382/170 |

(Continued)

OTHER PUBLICATIONS

Blum, A., Wardman, B., Solorio, T., and Warner, G. 2010. Lexical feature based phishing URL detection using online learning. In Proceedings of the 3rd ACM Workshop on Artificial Intelligence and Security. ACM, 54-60.

(Continued)

*Primary Examiner* — Khoi V Le (57) ABSTRACT

A system and a method for automatically clustering sandbox analysis reports of similar malware samples. An automated malware analysis process includes receiving from a sandbox server the sandbox analysis reports of the similar malware samples at an application programming interface (API) of the clustering server, clustering similar Uniform Resource Locators (URLs) together and clustering the sandbox analysis reports of events in sandbox reports clusters (1-*n*) based on the URL clustering, static properties of the malware samples and dynamic properties of the malware samples.

18 Claims, 7 Drawing Sheets

(51) Int. Cl.
*G06F 40/242* (2020.01)
*G06F 40/284* (2020.01)

(56) References Cited

U.S. PATENT DOCUMENTS

2011/0257893 A1* 10/2011 Taylor .................... G16B 20/00
702/19
2016/0021141 A1* 1/2016 Liu ...................... H04L 63/1425
726/23

OTHER PUBLICATIONS

Choi, H., Zhu, B., and Lee, H. 2011. Detecting malicious web links and identifying their attack types. In Proceedings of the 2nd USENIX conference on Web application development. USENIX Association, 11-11.
Ma, J., Saul, L., Savage, S., and Voelker, G. 2009. Beyond blacklists: learning to detect malicious web sites from suspicious URLs. In Proceedings of the 15th ACM SIGKDD international conference on Knowledge discovery and data mining. ACM, 1245-1254.
Le, H., Pham, Q., Sahoo, D., and Hoi, S.2018. URLNet: Learning a URL Representation with Deep Learning for Malicious URL Detection arXiv preprint arXiv:1802.03162.
Morichetta, A., Bocchi, E., Metwalley, H., Mellia, M. 2016. Clue: clustering for mining web urls. In: 2016 28th International Teletraffic Congress (ITC 28), vol. 01, pp. 286-294.
Inang Edem, E., Benzaid, C., Al-Nemrat, A., and Watters, p. 2014. Analysis of Malware Behaviour: Using Data Mining Clustering Techniques to Support Forensics Investigation. Proceedings—5th Cybercrime and Trustworthy Computing Conference, CTC 2014. 10.1109/CTC.2014.10.
Hernandez,I., Rivero, C. R., Ruiz,D. and Corchuelo, R. "A Statistical Approach to URL-based web page clustering," in Proceedings of the 21 st International Conference Companion on World Wide Web. New York, NY, USA: ACM, 2012, pp. 525-526.
Tamersoy, A., Roundy, K., Chau, DH. 2104. Guilt by association: large scale malware detection by mining file-relation graphs, in: Proceedings of the 20th ACM SIGKDD international conference on Knowledge Discovery and Data Mining, ACM, pp. 1524-1533.
Upchurch, J., Zhou, X. 2015. Variant: a malware similarity testing framework. 10th International Conference on Malicious and Unwanted Software (Malware), IEEE, pp. 31-39.
Bayer, U., Comparetti, PM., Hlauschek, C., Kruegel, C., Kirda, E. 2009.Scalable, behavior-based malware clustering, in: NDSS, vol. 9, Citeseer, pp. 8-11.
Huang, K., Ye, Y., Jiang, Q. 2009. Ismcs: an intelligent instruction sequence-based malware categorization system, in: Anti-counterfeiting, Security, and Identification in Communication, IEEE, pp. 509-512.
Pai, F. Di Troia, C. A., Visaggio, T. H. 2016. Journal of ComputerVirology and Hacking Techniques, pp. 1-13.
Ye, Y., Li, T., Chen, Y., Jiang, Q. 2010. Automatic malware categorization using cluster ensemble, in: Proceedings of the 16th ACM SIGKDD international conference on Knowledge discovery and data mining, ACM, pp. 95-104.
Kinable, J., Kostakis, O. 2011. Malware classification based on call graph clustering, Journal in Computer Virology, v.7 n.4, p. 233-245.

* cited by examiner

| | 0 | 1 | 2 | 3 | 4 | 5 | 6 | 7 | 8 | 9 | Unnamed | event_id | protocol | domain | path | params | query | fragment |
|---|---|---|---|---|---|---|---|---|---|---|---|---|---|---|---|---|---|---|
| 0 | 0 | 0 | 0 | 0 | 0.999954 | 0 | 0 | 0 | 0 | 0 | 0 | 44 | | ctldl.<RedactedDomain01>.com | /msdownload/updat | | | fte44fe0dd9a95cS |
| 1 | 0 | 0 | 0 | 0 | 0 | 1 | 0 | 0 | 0 | 0 | 1 | 47 | | checkip.<RedactedDomain02>.org | | | | |
| 2 | 0 | 0 | 0 | 0 | 0 | 1 | 0 | 0 | 0 | 0 | 2 | 48 | | checkip.<RedactedDomain02>.org | | | | |
| 3 | 0 | 0 | 0 | 0 | 0.994675 | 0 | 0 | 0.99969 | 0 | 0 | 3 | 49 | | <RedactedDomain03>.com | /temps/lok | output=AFC54F.exe | | |
| 4 | 0 | 0 | 0 | 0 | 0 | 0 | 0 | 0 | 0 | 0 | 4 | 50 | | <RedactedDomain04>.com | /jan2018/panel/jan.exe | | | |
| 5 | 0 | 0 | 0 | 0 | 0 | 1 | 0 | 0 | 0 | 0 | 5 | 51 | | ieonline.<RedactedDomain05>.com | | | | |
| 6 | 0 | 0 | 0 | 0 | 0 | 0 | 0 | 0.986286 | 0 | 0 | 6 | 51 | http | crl.<RedactedDomain06>.com | /pca3-g5.crl | | | |
| 7 | 0 | 0 | 0 | 0 | 0 | 1 | 0 | 0 | 0 | 0 | 7 | 51 | | r20swj13mr.<RedactedDomain05>.com | | | | |
| 8 | 0 | 0 | 0 | 0 | 0 | 0.116561 | 0 | 0.876846 | 0 | 0 | 8 | 51 | http | csc3-2010-cr.<RedactedDomain06>.com | /CSC3-2010.crl | | | |
| 9 | 0 | 0 | 0 | 0 | 0 | 1 | 0 | 0 | 0 | 0 | 9 | 51 | | ocsp.<RedactedDomain06>.com | / | | | |
| 10 | 0 | 0 | 0 | 0 | 0 | 1 | 0 | 0 | 0 | 0 | 10 | 51 | | iecvlist.<RedactedDomain05>.com | | | | |
| 11 | 1 | 0 | 0 | 0 | 0 | 0 | 0 | 0 | 0 | 0 | 11 | 51 | http | ocsp.<RedactedDomain06>.com | /MFEwTzBNMEswSTAJBgUrDgMCGg | | | U |
| 12 | 0 | 0 | 0 | 0 | 0 | 1 | 0 | 0 | 0 | 0 | 12 | 51 | | sqm.telemetry.<RedactedDomain05>.com | | | | |
| 13 | 1 | 0 | 0 | 0 | 0 | 0 | 0 | 0 | 0 | 0 | 13 | 51 | http | ocsp.<RedactedDomain06>.com | /MFEwTzBNMEswSTAJBgUrDgMCGg | | | |
| 14 | 0 | 0 | 0 | 0 | 0 | 0.116561 | 0 | 0.876846 | 0 | 0 | 14 | 52 | http | csc3-2010-cr.<RedactedDomain06>.com | /CSC3-2010.crl | | | |
| 15 | 0 | 0 | 0 | 0 | 0.999909 | 0 | 0 | 0 | 0 | 0 | 15 | 52 | http | www.<RedactedDomain07>.com | /wp-content/plugin | | ver=3.51.0-2014 | |
| 16 | 0 | 0 | 0 | 0 | 0.999965 | 0 | 0 | 0 | 0 | 0 | 16 | 52 | http | www.<RedactedDomain07>.com | /wp-includes/js/wp-ver=4.3.14 | | | |
| 17 | 0 | 0 | 0 | 0 | 0.996458 | 0 | 0 | 0 | 0 | 0 | 17 | 52 | http | www.<RedactedDomain07>.com | /wp-content/plugin | ver=2.4.2 | | |
| 18 | 0 | 0 | 0 | 0 | 0.999966 | 0 | 0 | 0 | 0 | 0 | 18 | 52 | http | www.<RedactedDomain07>.com | /wp-content/plugin | ver=1.2.1 | | |
| 19 | 0 | 0 | 0 | 0 | 0 | 1 | 0 | 0 | 0 | 0 | 19 | 52 | | iecvlist.<RedactedDomain05>.com | | | | |
| 20 | 1 | 0 | 0 | 0 | 0 | 0 | 0 | 0 | 0 | 1 | 20 | 52 | http | www.<RedactedDomain07>.com | /MFEwTzBNMEswSTAJBgUrDgMCGg | | | |
| 21 | 0 | 0 | 0 | 0 | 0 | 0 | 0 | 0 | 0 | 0 | 21 | 52 | http | ocsp.<RedactedDomain06>.com | /wp-includes/js/jqu | ver=1.11.3 | | |
| 22 | 0 | 0 | 0 | 0 | 0 | 0 | 0 | 0 | 0 | 0 | 22 | 52 | http | www.<RedactedDomain07>.com | /wp-content/themes/Silvia2012ok1ca | | | |
| 23 | 0 | 0 | 0 | 0 | 0.999978 | 0 | 0 | 0 | 0 | 0 | 23 | 52 | http | www.<RedactedDomain07>.com | /wp-content/plugin | ver=2.4.2 | | |
| 24 | 1 | 0 | 0 | 0 | 0 | 0 | 0 | 0 | 0 | 1 | 24 | 52 | http | www.<RedactedDomain07>.com | /MFEwTzBNMEswSTAJBgUrDgMCGg | | | |
| 25 | 0 | 0 | 0 | 0 | 0.999894 | 0 | 0 | 0 | 0 | 0 | 25 | 52 | http | www.<RedactedDomain07>.com | /wp-content/themes/Silvia2012ok1ca | | | |
| 26 | 0 | 0 | 0 | 0 | 0 | 0 | 0 | 0.986286 | 0 | 0 | 26 | 52 | http | crl.<RedactedDomain06>.com | /pca3-g5.crl | | | |

AUTOMATED MALWARE ANALYSIS THAT AUTOMATICALLY CLUSTERS SANDBOX REPORTS OF SIMILAR MALWARE SAMPLES

CROSS REFERENCE TO RELATED APPLICATIONS

This application claims the benefit of U.S. Provisional Application Ser. No. 62/769,604 entitled "CLUSTERING OF SANDBOX REPORTS BASED ON SOFT CLUSTERING OF URLS," filed on Nov. 20, 2018, the contents of which are hereby incorporated by reference herein in their entirety.

BACKGROUND

1. Field

Aspects of the present invention generally relate to a system and a method for automated malware analysis that automatically clusters sandbox analysis reports of similar malware samples based on soft clustering of Uniform Resource Locators (URLs) to provide a decision support solution that simplifies the manual vetting task of security analysts.

2. Description of the Related Art

A user can report suspicious emails to a cyber security system (several hundred a day). Attachments of reported emails are detonated in a sandbox environment and the generated analysis reports (events), containing URLs, filenames and in general a description of the malware behavior, are used by security analysts to improve the security defenses of an enterprise.

Unfortunately, this process cannot be fully automated, due to the potential presence of false positives samples in the analysis (e.g. wrongly reported email). For this reason, a security analyst must manually vet the output of every sandbox analysis, identify those describing malicious activities and initiating respective mitigation actions (e.g. blacklisting a certain domain at the proxy). This task is performed daily for all the new samples analyzed in the past 24 hours and it is a time-consuming endeavor, requiring the analyst to go through a potentially extensive list of URLs and file indicators to gain insights about the type of activities performed by the analyzed sample. Even the task of determining if an individual URL is malicious or not might be a non-straightforward effort, requiring the analyst to leverage internal and external enrichment resources to determine the right course of action.

On the other hand, different instances of the same malware families tend to exhibit similar behaviors, like connecting to command and control servers with similar names, storing files using similar filenames on the victim host or downloading payload from similar paths on different domains. Indicators generated by similar malware samples usually require the same actions by the analyst and, as such, could be executed in bulk, optimizing the analyst time.

Clustering approaches used in malware analysis has several drawbacks. For example, lexical features extraction method has been used for the clustering problem. A major drawback of using the lexical features is mixed data types. Using a mix of continuous and binary features does not allow using certain distance metrics during classification. Clustering of sandbox analysis reports studied in the literature also has several drawbacks. For example, malware graphs can provide accurate representations but are computationally very expensive to create.

Therefore, there is a need for better automated malware analysis of sandbox analysis reports of malware samples.

SUMMARY

Briefly described, aspects of the present invention relate to a system and a method for automated malware analysis that automatically clusters sandbox analysis reports of similar malware samples based on soft clustering of Uniform Resource Locators (URLs) to provide a decision support solution that simplifies the manual vetting task of security analysts. A malware database has been utilized as a main source of data for the present invention. Database has been extracted in JavaScript Object Notation (JSON) format and sandbox reports which include URL connections has been identified. In computing, JavaScript Object Notation (JSON) is an open-standard file format that uses human-readable text to transmit data objects consisting of attribute-value pairs and array data types (or any other serializable value). As a first of the clustering of URLs, a text encodings-based feature extraction method has been used for the clustering problem by an automated malware analysis system. The automated malware analysis system uses an auto encoder-based approach to obtain a reduced dimension, continuous representation of the mixed data type feature space. This approach supports the use of different clustering algorithms and a richer set of distance metrics. Using the feature extraction method described above, the automated malware analysis system obtains features to be used in clustering of the URLs. The automated malware analysis system can use different clustering approaches such as Density based spatial clustering of applications with noise (DBSCAN) (distance based), k-means and Gaussian mixture models (GMMs). Due to uncertain nature of the problem, GMM is used as the best option as it allows probabilistic clustering of the URLs. At the next stage, the automated malware analysis system uses the clustering of URLs as features for clustering the sandbox reports: together with average clustering probabilities of URLs, other event features such as timestamp of the analysis, static properties of the sample and dynamic properties. Due to mixed data type of event features, the automated malware analysis system uses Gower's distance for calculating a distance matrix. Final clustering of events is determined using density based spatial clustering.

In accordance with one illustrative embodiment of the present invention, an automated malware analysis system is provided for automatically clustering sandbox analysis reports of similar malware samples. The system comprises a sandbox server including a first processor and a first memory. The first memory stores a sandbox virtual machine comprising software instructions. These software instructions, when executed by the first processor, generate the sandbox analysis reports of the similar malware samples. The system further comprises a clustering server including a second processor and a second memory. The second memory stores a Uniform Resource Locator (URL) categorizer comprising software instructions. These software instructions, when executed by the second processor, cluster similar URLs together. The second memory further stores a report categorizer comprising software instructions. These software instructions, when executed by the second processor, cluster the sandbox analysis reports of events based on the URL clustering performed by the URL categorizer, static properties of the malware samples and dynamic properties of the malware samples.

In accordance with another illustrative embodiment of the present invention, a non-transitory computer readable medium comprising computer instructions capable of being executed in a processor of a clustering server of an automated malware analysis system is provided. The computer instructions configured to receive from a sandbox server sandbox analysis reports of similar malware samples at an application programming interface (API) of the clustering server for automatically clustering the sandbox analysis reports of the similar malware samples. The computer instructions further configured to cluster similar Uniform Resource Locators (URLs) together. The computer instructions further configured to cluster the sandbox analysis reports of events based on the URL clustering, static properties of the malware samples and dynamic properties of the malware samples. The computer instructions further configured to send all sandbox reports clusters (1-$n$) from the clustering server to the sandbox server so that an analyst can focus only on one event per cluster and quickly verify correctness of a same decision for all similar events in a same cluster.

BRIEF DESCRIPTION OF THE DRAWINGS

FIG. 4 illustrates soft clustering of URLs using GMMs in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a system and a method for automated malware analysis that automatically clusters sandbox analysis reports of similar malware samples based on soft clustering of Uniform Resource Locators (URLs) to provide a decision support solution that simplifies the manual vetting task of security analysts. An automated malware analysis system comprises a sandbox server including a first processor and a first memory and a clustering server including a second processor and a second memory. The sandbox server includes a sandbox virtual machine to generate the sandbox reports of the similar malware samples. The clustering server includes a Uniform Resource Locator (URL) categorizer to cluster similar URLs together. The clustering server further includes a report categorizer to cluster analysis reports of events based on the URL clustering performed by the URL categorizer, static properties of the malware samples and dynamic properties of the malware samples. In this way, a decision support solution is provided for security analysts to simplify the manual vetting task by automatically clustering sandbox reports of similar malware samples. Using this automated malware analysis process the analyst can focus only on one event per cluster and quickly verify the correctness of the same decision for all the similar events in the same cluster. At a high level, the decision support solution consists of a 2-step approach: step 1: similar URLs are clustered together (e.g. URLs generated by similar domain generation algorithms (DGAs), known legitimate websites like microsoft.com, etc.) using an auto encoder based feature extraction as input to GMMs; and step 2: analysis reports are clustered based on three main set of features: the URL clustering performed at step 1, static properties of the sample (e.g. Yet Another Recursive/Ridiculous Acronym (YARA)-rules matches) and other dynamic properties of the malware (e.g. disk access during execution). YARA rules are a way of identifying malware (or other files) by creating rules that look for certain characteristics. With YARA descriptions of malware families can be created based on textual or binary patterns. YARA is a tool used to identify and classify malware samples. YARA identifies and classifies malware based on custom rules created in a platform. A rule is a description based on textual or binary patterns. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of an automated malware analysis system according to the present disclosure are described below with reference to FIGS. 1-7 herein. Like reference numerals used in the drawings identify similar or identical elements throughout the several views. The drawings are not necessarily drawn to scale.

Figure 1:
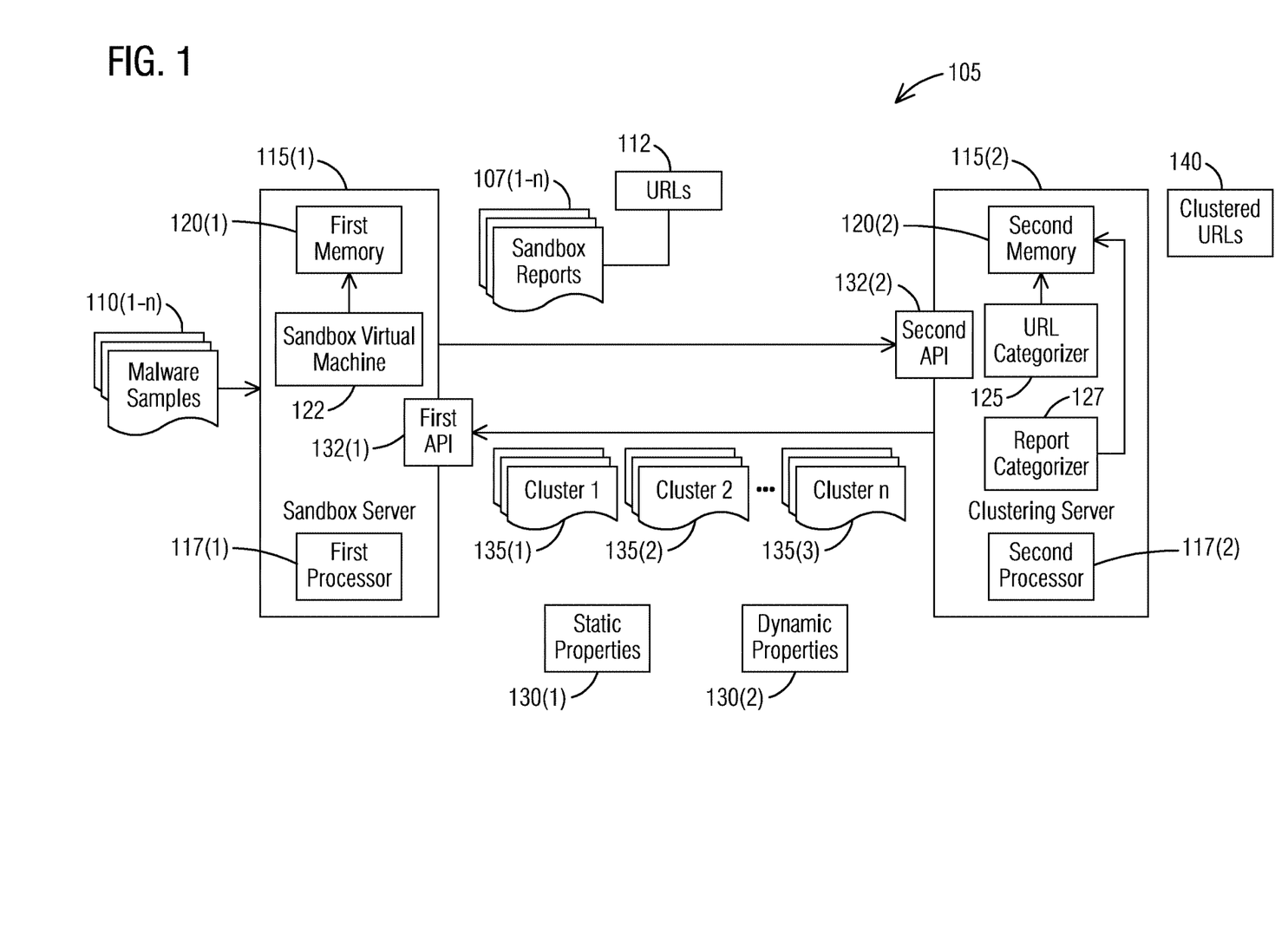
FIG. 1 illustrates a block diagram of an automated malware analysis system that automatically clusters sandbox analysis reports of similar malware samples based on soft clustering of Uniform Resource Locators (URLs) to provide a decision support solution that simplifies the manual vetting task of security analysts in accordance with an exemplary embodiment of the present invention.

Consistent with one embodiment of the present invention, FIG. 1 represents a block diagram of an automated malware analysis system 105 that provides automatic clustering of sandbox analysis reports of similar malware samples based on soft clustering of Uniform Resource Locators (URLs) in accordance with an exemplary embodiment of the present invention. The automated malware analysis system 105 is configured to automatically cluster sandbox analysis reports 107(1-$n$) of similar malware samples 110(1-$n$) based on soft clustering of Uniform Resource Locators (URLs) 112 to provide a decision support solution that simplifies the manual vetting task of security analysts. For being able to analyze a malware sample 110, the automated malware analysis system 105 has a runtime environment in place. A file or an email attachment infected by a virus is an example of the malware sample 110.

The automated malware analysis system 105 performs a sandboxing analysis to generate sandbox analysis reports 107(1-$n$) in JavaScript object notation (JSON) format. A Sandbox Analysis Report 107 provides insight as to what occurred during a sandbox process and any signatures that lead to its scan result. For example, a Sandbox Analysis Report package may provide detection results for known and new advanced threats. It includes static and multiple dynamic analyses of uploaded files in an array of sandboxes. In addition, files that were uploaded and were sent for a sandbox analysis will result with a sandbox report. A sandbox is a testing environment that executes potentially malicious files or URL requests in an isolated area, typically on a virtual machine. If the sandboxing application finds that an executed file modified system files or infected the system in any way, those issues will not spread to other areas. Files are executed in their own sequestered area, where they can be tested without posing any threat to a client computer or network. Because the environment is not actually connected to a network, any malware that executes in the sandbox environment cannot infect a real device or network. The automated malware analysis system 105 evaluates the threat of a given file in one or more Windows virtual machines or emulated virtual machines and provides a reputation score as a number between 1 and 100. The higher the number, the greater the threat. Sandboxing may be a cloud-based service that uses static code analysis and behavioral analysis to detect advanced threats. Sandbox services use different methods to identify the actions an executable file would take on a client workstation, including malicious URL web requests and changes to system files. Once a file is analyzed, sandbox services score the file and report it.

In the automated malware analysis system 105, sandbox gets a file, executes it automatically, and disables warning and basic security features in order to allow the malware to exhibit its malicious behavior. Then records network connection and other actions performed by the malware. This can be done fully automated or interactively. The latter approach is used in some analysis where the malware requires some form of user interaction in order to detonate. Interaction is achieved by having a user clicking on buttons/popups/windows in a virtual machine.

The automated malware analysis system 105 comprises a sandbox server 115(1) including a first processor 117(1) and a first memory 120(1) and a clustering server 115(2) including a second processor 117(2) and a second memory 120(2). The sandbox server 115(1) is a server machine hosting a sandbox virtual machine 122 where binary samples are executed. Each execution generates a new sandbox analysis report, 107 which is sent via an API call to the clustering server 115(2). The clustering server 115(2) is a server machine hosting a URL categorizer 125 software and a report categorizer 127 software. Once the clustering server 115(2) receives the sandbox analysis reports 107(1-$n$) from the sandbox server 115(1) via an API, it processes them using the two categorizers and it returns the new report clustering to the sandbox server 115(1) via an API call. Application Programming Interface (API) is an interface through which the server functionalities are triggered.

The sandbox server 115(1) includes the sandbox virtual machine 122 to generate the sandbox analysis reports 107 (1-$n$) of the similar malware samples 110(1-$n$). The clustering server 115(2) includes the Uniform Resource Locator (URL) categorizer 125 to cluster similar URLs 112 together. The clustering server 115(2) further includes the report categorizer 127 to cluster the sandbox analysis reports 107(1-$n$) of events based on the URL clustering performed by the URL categorizer 125, static properties 130(1) of the malware samples 110(1-$n$) and dynamic properties 130(2) of the malware samples 110(1-$n$). In this description, the term Event is used as the technical representation of a sandbox analysis report 107. In simple terms, event is another word for "sandbox analysis report".

The first memory 120(1) stores the sandbox virtual machine 122 which comprises software instructions when executed by the first processor 117(1) it generates the sandbox analysis reports 107(1-$n$) of the similar malware samples 110(1-$n$). The second memory 120(2) stores the Uniform Resource Locator (URL) categorizer 125 which comprises software instructions when executed by the second processor 117(2) it clusters similar URLs 112 together. The second memory 120(2) further stores the report categorizer 127 which comprises software instructions when executed by the second processor 117(2) it clusters the sandbox analysis reports 107(1-$n$) of events based on the URL clustering performed by the URL categorizer 125, the static properties 130(1) of the malware samples and the dynamic properties 130(2) of the malware samples 110(1-$n$). Other static and dynamic properties or features 130(1-2) include any other information in the sandbox analysis report 107 that is not a URL.

The sandbox virtual machine 122 is a virtual host, running standard technologies, that emulates via software the behavior of a physical machine. A sandbox is a virtual environment where the malware samples 110(1-$n$) can be safely "detonated", i.e. executed to trigger the malicious behavior, without effects on the host system. A sandbox analysis report 107 is a detailed report about the execution of a binary sample within the sandbox. A sandbox analysis report 107 includes static information about the sample (like file size, filename, compile time, etc. . . . ) as well as details about its execution (e.g. the sequence of system calls invoked over time, the list of resources allocated, files read and written, etc.) A URL 112 is a location or address identifying where documents can be found on the Internet. In the context of the present invention, the URLs 112 are extracted from a sandbox analysis report 107 and they indicate the remote resources, like files or webpages, that a binary sample attempted accessing during its execution.

The URL categorizer 125 is a component that categorizes a list of URLs using advanced machine learning techniques. The URL categorizer 125 receives in input a list of URLs and return a list of URL lists, divided by categories according to URL similarity. The definition of category and similarity may be specified based on the description of the various internal components.

The sandbox server 115(1) further comprises a first application programming interface (API) 132(1) to receive a sandbox reports cluster 1 135(1), a sandbox reports cluster 2 135(2), a sandbox reports cluster 3 135(3) and . . . a sandbox reports cluster n 135($n$) from the clustering server 115(2). The clustering server 115(2) further comprises a second application programming interface (API) 132(2) to receive the sandbox analysis reports 107(1-$n$) from the sandbox server 115(1).

The URL categorizer 125 to soft cluster the similar URLs 112 together using an auto-encoder network-based feature extraction as input to a Gaussian mixture model (GMM). Auto-encoder network can be used for dimensionality reduction of data and for re-construction of sample population with unknown, complex multivariate probability distribution, where small-probability samples have little contribution to the auto-encoder network, leading to high re-construction error. For example, a deep "auto-encoder" network structure may be trained to learn low-dimensional codes from high-dimensional input vectors. A Gaussian mixture model is a probabilistic model that assumes all the data points are generated from a mixture of a finite number of Gaussian distributions with unknown parameters. Gaussian mixture models are a probabilistic model for representing normally distributed subpopulations within an overall population. Mixture models in general don't require knowing which subpopulation a data point belongs to, allowing the model to learn the subpopulations automatically. A GMM attempts to find a mixture of multi-dimensional Gaussian probability distributions that best model any input dataset. The mixture of Gaussians, a.k.a. GMM is used for density estimation and clustering.

GMM is a clustering method based upon linear learning models. In particular, given a set of training data XL xM, where L is the dimension of the data and M is the number of samples, the clustering method learns K centroids such that each sample can be assigned to the closest centroid. Suppose the observed feature vectors form a feature space and the appropriate K centroids in the high-dimensional feature space are known. A typical pipeline defines a function f: $RL \rightarrow RK$ that maps the observed L-dimensional feature vector to a K-dimensional feature vector (K<L). For instance, first calculate the affiliations for each observed feature vector (w.r.t. the K centroids) and then use such affiliations as morphological signatures to represent each key point in the feature space. Given a Gaussian mixture model, the goal is to maximize the likelihood function w.r.t. the parameters (means, covariances and mixing coefficients) . Clustering with a GMM may be done using the Statistics and Machine Learning and specifying optional parameters when fitting the GMM model.

GMMs are used for data clustering. The automated malware analysis system 105 can use GMMs to perform either hard clustering or soft clustering on query data. To perform hard clustering, the GMM assigns query data points to the multivariate normal components that maximize the component posterior probability, given the data. That is, given a fitted GMM, the automated malware analysis system 105 assigns query data to the component yielding the highest posterior probability. Hard clustering assigns a data point to exactly one cluster. Additionally, the automated malware analysis system 105 can preferably use a GMM to perform a more flexible clustering on data, referred to as soft (or fuzzy) clustering. Soft clustering methods assign a score to a data point for each cluster. The value of the score indicates the association strength of the data point to the cluster. As opposed to hard clustering methods, soft clustering methods are flexible because they can assign a data point to more than one cluster. When the automated malware analysis system 105 performs GMM clustering, the score is the posterior probability. GMM clustering can accommodate clusters that have different sizes and correlation structures within them. Therefore, GMM clustering can be more appropriate than methods such as k-means clustering. Like many clustering methods, GMM clustering requires one to specify the number of clusters before fitting the model. The number of clusters specifies the number of components in the GMM.

The report categorizer 127 is configured to cluster the sandbox analysis reports 107(1-n) of events so that an analyst can focus only on one event per cluster and quickly verify correctness of a same decision for all similar events in a same cluster. The report categorizer 127 is a component that given in input a list of sandbox analysis reports and a categorization of URLs returns a partition of the sandbox analysis reports. Each partition (cluster) represents a different category of sandbox analysis reports. Sandbox report clusters imply a group of sandbox analysis reports belonging to the same category, according to the report categorizer 127. In this context, a category is a set of sandbox analysis reports 107 with similar properties that usually identify samples of malware belonging to the same phishing campaigns.

The URL categorizer 125 to soft cluster the similar URLs by performing text encoding. The text encoding uses a standard for the representation of texts in digital form. For example, an encoding standard is a numbering scheme that assigns each text character in a character set to a numeric value. A character set can include alphabetical characters, numbers, and other symbols. Encoding is the process of converting data from one form to another. Whenever data is encoded, it can only be read by a program that supports the correct type of encoding. Most text editors support multiple types of text encoding, so it is rare to find a text file that will not open in a standard text editor. However, if a text editor does not support the encoding used in a text document, some or all of the characters may appear as strange symbols rather than the intended text.

The URL categorizer 125 to perform feature extraction after the text encoding. The URL categorizer 125 to perform a GMM based soft clustering of the similar URLs 112 after the feature extraction.

The report categorizer 127 to determine an event feature matrix from clustered URLs 140. The clustered URLs 140 may be a list of URLs grouped by a category. In this context, a category is a set of sandbox analysis reports 107 with similar properties that usually identify samples of malware belonging to the same phishing campaigns.

The report categorizer 127 to determine a Gower's distance matrix from the event feature matrix. The first step involves calculating the Gower's distance matrix to separate sandbox analysis reports 107 into (dis)similar groups from event feature data. For example, a Gower's distance matrix may be generated for the uncorrelated event features, with distance measure ranging from, e.g., 0 to 1. With the Gower's distance matrix, one can visually compare event features between sandbox analysis reports 107. Results are calculated by using a Gower's distance matrix derived from sandbox analysis reports 107 (dis)similarities based on properties that usually identify samples of malware belonging to the same or different phishing campaigns. Gower's distance matrix is a non-estimation method and the Gower's distance matrix can be used to detect detectable differences as the Gower's distance matrix can identify differences of each sandbox analysis report in a multidimensional functional space. Data sets may be analyzed using the non-estimation method (Gower's distance matrix) by calculating the Gower's distance matrix among observations to identify the diverse pairs of sandbox analysis reports 107. Gower's distance matrix is used for similarity calculations as it has shown to be more reliable for mixed data with a preponderance of weighted binary data. Cluster analysis may be used to examine overall patterning within a Gower's distance matrix. Clusters of sandbox analysis reports 107 may be predicted to fall into distinct spatial groups.

The report categorizer 127 to perform a density-based spatial clustering after determining the Gower's distance matrix using a Density-based spatial clustering of applications with noise (DBSCAN) algorithm. DBSCAN is a data clustering algorithm that is used for data mining and machine learning. Based on a set of points (e.g., in a bidimensional space), DBSCAN groups together points that are close to each other based on a distance measurement and a minimum number of points. It also marks as outliers the points that are in low-density regions.

The DBSCAN algorithm basically requires 2 parameters:

eps: specifies how close points should be to each other to be considered a part of a cluster. It means that if the distance between two points is lower or equal to this value (eps), these points are considered neighbors.

minPoints: the minimum number of points to form a dense region. For example, if one sets the minPoints parameter as 5, then one needs at least 5 points to form a dense region.

The DBSCAN algorithm is used to find associations and structures in data that are hard to find manually but that can be relevant and useful to find patterns and predict trends such as in clustering. It is a density-based clustering non-parametric algorithm: given a set of points in some space, it groups together points that are closely packed together (points with many nearby neighbors), marking as outliers points that lie alone in low-density regions (whose nearest neighbors are too far away).

Consider a set of points in some space to be clustered. Let c be a parameter specifying the radius of a neighborhood with respect to some point. For the purpose of DBSCAN clustering, the points are classified as core points, (density-) reachable points and outliers, as follows:

A point p is a core point if at least minPts points are within distance c of it (including p).

A point q is directly reachable from p if point q is within distance c from core point p. Points are only said to be directly reachable from core points.

A point q is reachable from p if there is a path $p_1, \ldots, p_n$ with $p_1 = p$ and $p_n = q$, where each $p_{i+1}$ is directly reachable from $p_i$. Note that this implies that all points on the path must be core points, with the possible exception of q.

All points not reachable from any other point are outliers or noise points.

Now if p is a core point, then it forms a cluster together with all points (core or non-core) that are reachable from it. Each cluster contains at least one core point; non-core points can be part of a cluster, but they form its "edge", since they cannot be used to reach more points.

Reachability is not a symmetric relation since, by definition, no point may be reachable from a non-core point, regardless of distance (so a non-core point may be reachable, but nothing can be reached from it). Therefore, a further notion of connectedness is needed to formally define the extent of the clusters found by DBSCAN.

Two points p and q are density-connected if there is a point o such that both p and q are reachable from o. Density-connectedness is symmetric. A cluster then satisfies two properties: all points within the cluster are mutually density-connected and if a point is density-reachable from any point of the cluster, it is part of the cluster as well.

The report categorizer 127 to output the sandbox reports clusters 1-$n$ 135(1-$n$). Clustering, an unsupervised machine learning technique that aims to grouping analogous entities into one cluster and partitioning the dissimilar objects into another cluster. A cluster is defined as a subset of similar objects, defined by certain parameters, within a larger set.

Figure 2:
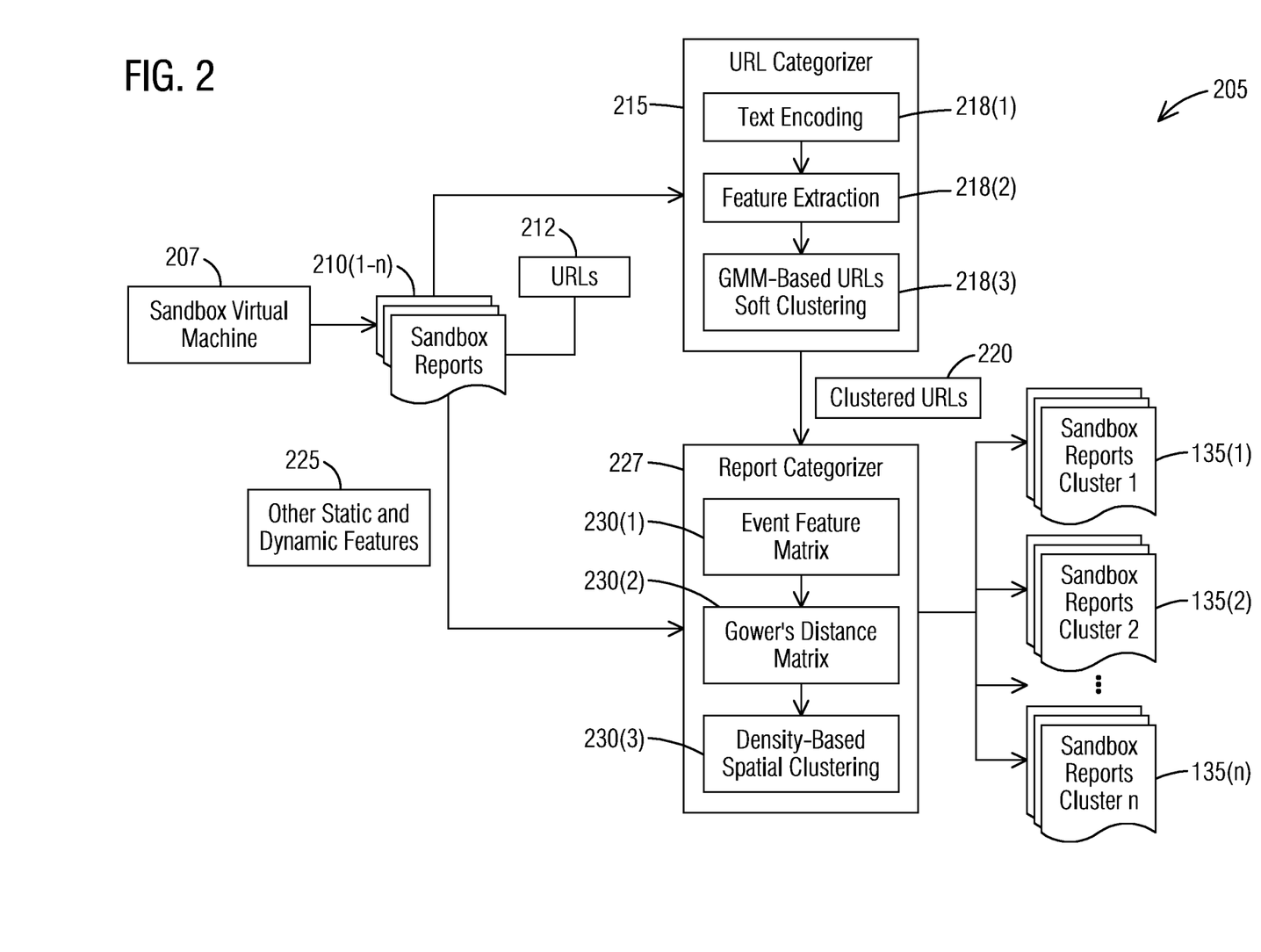
FIG. 2 illustrates a block diagram of an automated malware analysis process in accordance with an exemplary embodiment of the present invention.

Referring to FIG. 2, it illustrates a block diagram of an automated malware analysis process 205 in accordance with an exemplary embodiment of the present invention. A sandbox virtual machine 207 generates a plurality of sandbox analysis reports 210(1-$m$) of similar malware samples. The plurality of sandbox analysis reports 210(1-$m$) contain URLs 212 which are sent to a URL categorizer 215. The URL categorizer 215 performs text encoding in step 218(1), performs feature extraction in step 218(2) and performs GMM-based URL's soft clustering in step 218(3) to generate clustered URLs 220. The clustered URLs 220 and other static and dynamic features 225 are sent to a report categorizer 227 to generate the sandbox reports cluster 1-$n$ 135(1-$n$). The report categorizer 227 calculates an event feature matrix in step 230(1), calculates a Gower's distance matrix in step 230(2) and performs density-based spatial clustering in step 230(3).

Figure 3:
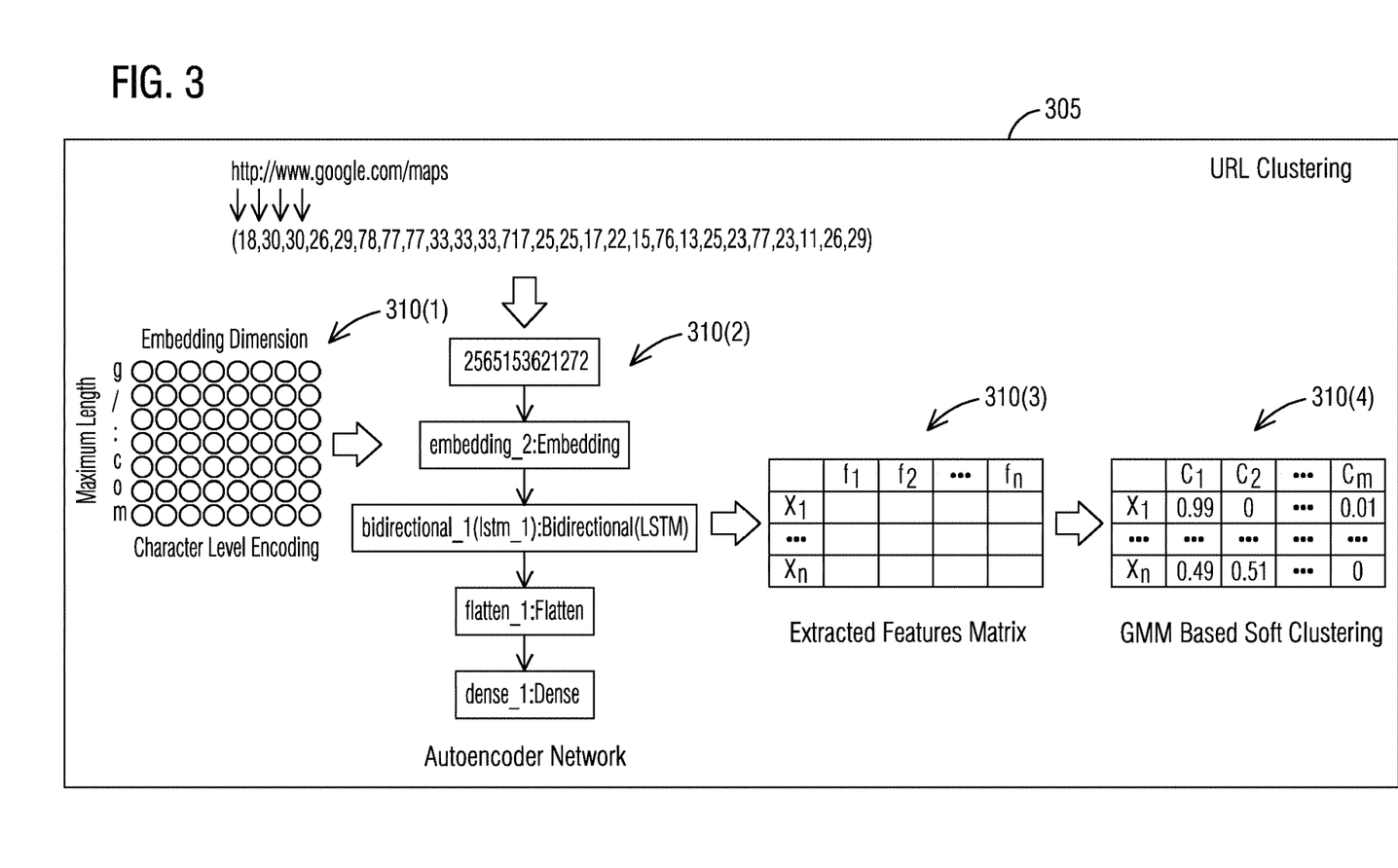
FIG. 3 illustrates a pipeline of Uniform Resource Locator (URL) clustering in accordance with an exemplary embodiment of the present invention.

There are two key steps of the present approach: 1. auto-encoder network-based feature extraction used as input to GMMS for soft clustering of URLs. and 2. using the soft clustering for a higher-level clustering of related events. In particular, FIG. 3 shows a pipeline of the proposed solution. Given a URL, the automated malware analysis process 205 tokenizes the URL using a 100-character dictionary. The tokenization is used as input to an auto-encoder network. At an embedding layer of the auto-encoder network, each character is embedded to a n-dimensional vector which is denoted as "embedding dimension. This embedding is initialized randomly and learned through a training phase. The automated malware analysis process 205 uses a bidirectional LSTM model due to its success in capturing sequences. the automated malware analysis process 205 trains the auto-encoder network with a batch size of 32 in 50 epochs. As the final model, the automated malware analysis process 205 chooses the model with the best validation accuracy. The automated malware analysis process 205 extracts the intermediate features at a LSTM layer for clustering with GMMs. The automated malware analysis process 205 uses AIC and BIC scores to determine the optimal number of clusters.

At the next stage, the automated malware analysis process 205 uses the clustering of URLs 112 as features for clustering the events: together with average clustering probabilities of URLs, the automated malware analysis process 205 uses other event features such as timestamp of the analysis (similar malware tend to be delivered within the same phishing campaign), the static properties 130(1) of the sample (e.g. filename, format, whether it's encrypted or not, one hot encoding of YARA rules matches, file size) and the dynamic properties 130(2) (e.g. number of dropped files, number of URLs per event, accesses performed). Due to mixed data type of event features, the automated malware analysis process 205 uses Gower's distance for calculating the distance matrix. Final clustering of events is determined using density based spatial clustering.

Turning now to FIG. 3, which illustrates a pipeline 305 of Uniform Resource Locator (URL) clustering in accordance with an exemplary embodiment of the present invention. The pipeline 305 of Uniform Resource Locator (URL) clustering includes a step 310(1) of character level encoding, a step 310(2) of using an auto-encoder network, a step 310(3) of extracting a features matrix and a step 310(4) of GMM-based soft clustering. The automated malware analysis system 105 of FIG. 1 can preferably use a GMM to perform a more flexible clustering on data, referred to as soft (or fuzzy) clustering. Soft clustering methods assign a score to a data point for each cluster. The value of the score indicates the association strength of the data point to the cluster. As opposed to hard clustering methods, soft clustering methods are flexible because they can assign a data point to more than one cluster. When the automated malware analysis system 105 performs GMM clustering, the score is the posterior probability. GMM clustering can accommodate clusters that have different sizes and correlation structures within them. Therefore, GMM clustering can be more appropriate than methods such as k-means clustering. Like many clustering methods, GMM clustering requires one to specify the number of clusters before fitting the model. The number of clusters specifies the number of components in the GMM.

FIG. 4 illustrates soft clustering of URLs using GMMs in accordance with an exemplary embodiment of the present invention. In FIG. 4, a "website" information is redacted, i.e. www.website.com becomes www.<redacted URL1>.com. Clustering, an unsupervised machine learning technique that aims to grouping analogous entities into one cluster and partitioning the dissimilar objects into another cluster. A cluster is defined as a subset of similar objects, defined by certain parameters, within a larger set. Gaussian mixture model (GMM) is a clustering method based upon linear learning models. In particular, given a set of training data XL×M, where L is the dimension of the data and M is the number of samples, the clustering method learns K centroids such that each sample can be assigned to the closest centroid. Suppose the observed feature vectors form a feature space and the appropriate K centroids in the high-dimensional feature space are known. For example, a pipeline defines a function f: RL→RK that maps the observed L-dimensional feature vector to a K-dimensional feature vector (K<L).

The automated malware analysis system 105 can preferably use a GMM to perform a more flexible clustering on data, referred to as soft clustering. Soft clustering methods assign a score to a data point for each cluster. The value of the score indicates the association strength of the data point to the cluster. Soft clustering methods are flexible because they can assign a data point to more than one cluster. When the automated malware analysis system 105 performs GMM clustering, the score is the posterior probability. GMM clustering can accommodate clusters that have different sizes and correlation structures within them.

Figure 5:
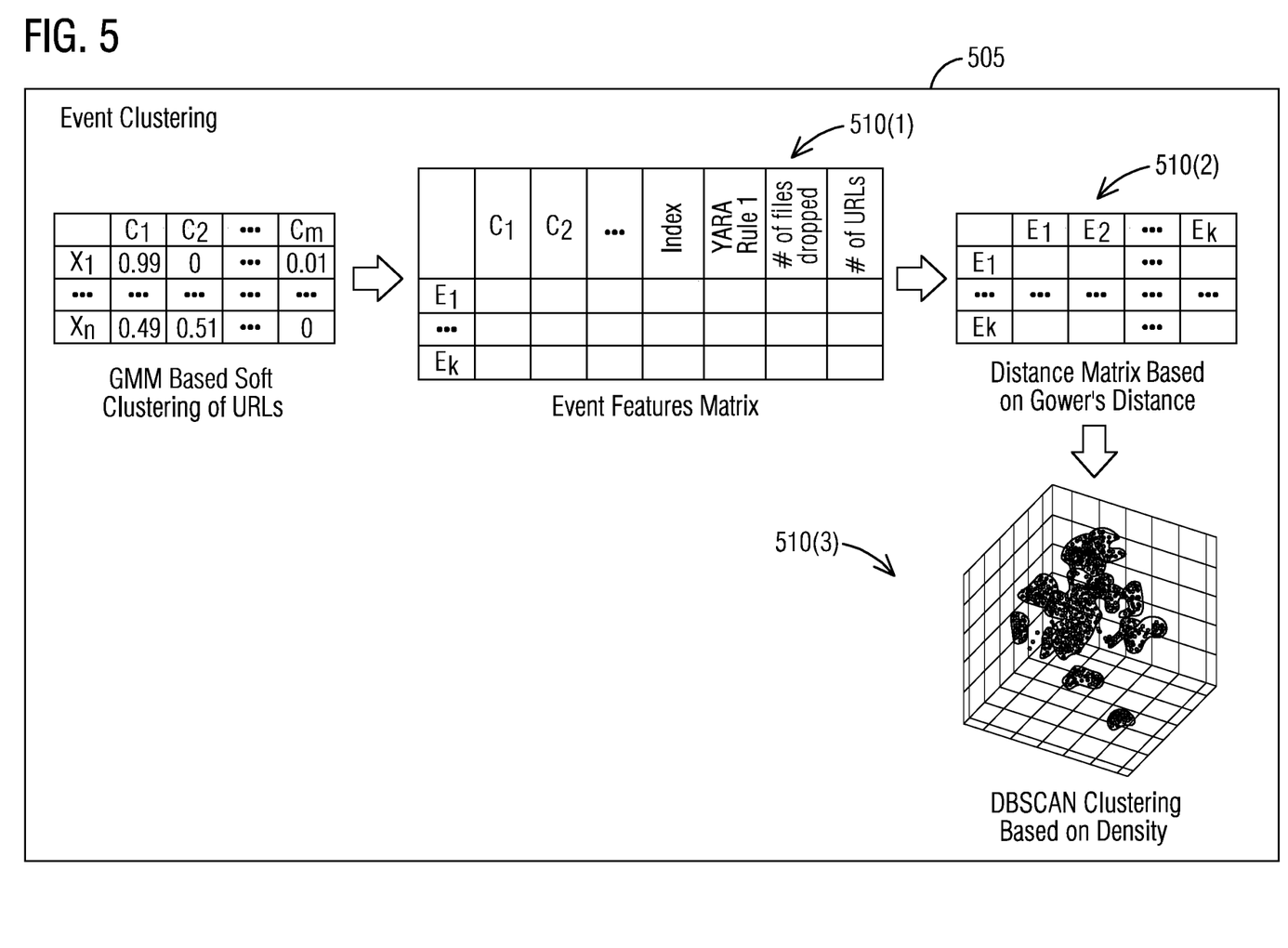
FIG. 5 illustrates a pipeline of event clustering for clustering sandbox analysis reports in accordance with an exemplary embodiment of the present invention.

As seen in FIG. 5, a pipeline 505 of event clustering for clustering sandbox analysis reports 107 is illustrated in accordance with an exemplary embodiment of the present invention. The pipeline 505 of event clustering for clustering sandbox analysis reports 107 includes a step 510(1) of calculating an event features matrix from the GMM-based soft clustering of URLs, a step 510(2) of calculating a distance matrix based on Gower's distance and a step 510(3) of performing DBSCAN clustering based on density.

Figure 6:
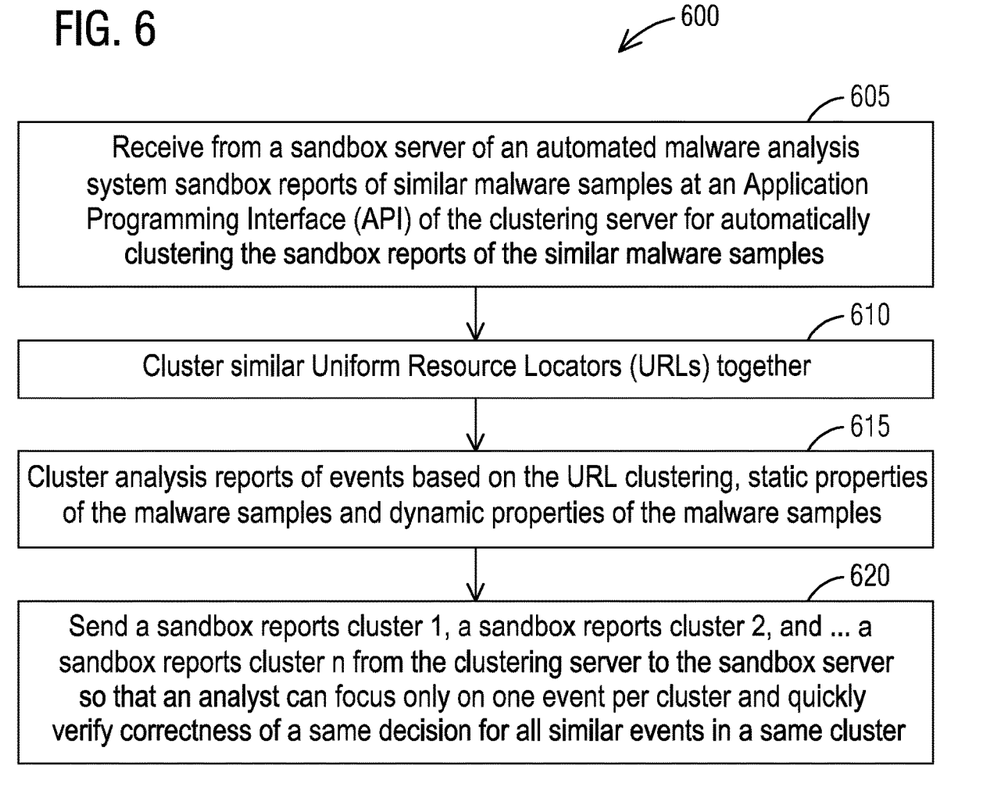
FIG. 6 illustrates a schematic view of a flow chart of a method for automatically clustering sandbox analysis reports of similar malware samples in an automated malware analysis system in accordance with an exemplary embodiment of the present invention.

FIG. 6 illustrates a schematic view of a flow chart of a method 600 for automatically clustering the sandbox analysis reports 107 of the similar malware samples 110 in the automated malware analysis system 105 in accordance with an exemplary embodiment of the present invention. Reference is made to the elements and features described in FIGS. 1-5. It should be appreciated that some steps are not required to be performed in any particular order, and that some steps are optional.

The method 600 comprises a step 605 of receiving from the sandbox server 115(1) the sandbox analysis reports 107 of the similar malware samples 110 at an application programming interface (API) of the clustering server 115(2) for automatically clustering the sandbox analysis reports 107 of the similar malware samples 110. The method 600 further comprises a step 610 of clustering similar Uniform Resource Locators (URLs) 112 together. The method 600 further comprises a step 615 of clustering the sandbox analysis reports 107 of events based on the URL clustering, the static properties 130(1) of the malware samples 110 and the dynamic properties 130(2) of the malware samples 110. The method 600 further comprises a step 620 of sending the sandbox reports clusters 1-n 135(1-n) from the clustering server 115(2) to the sandbox server 115(1) so that an analyst can focus only on one event per cluster and quickly verify correctness of a same decision for all similar events in a same cluster.

There are multiple advantages of the solution at URL level clustering and event level clustering. At the URL level, use of auto-encoders enables a compact accurate representation of the URL in the continuous space. This continuous representation enables use of different distance metrics (e.g., Euclidean together with k-means). Auto-encoder based feature representation together with Gaussian mixture models, achieves a soft clustering of the URLs. A URL might be similar to multiple other class of URLs due to certain features like, page extension, entropy, length etc. With soft clustering, the confidence of the algorithm in assigning a URL in certain clusters. At the event level clustering, a multilevel clustering for malwares is used. This method supports mixed data clustering. Advantages resulting from the present invention can serve as a decision aid to security analysts to perform URL and event analysis in a faster and more informed way. Accordingly, a decision support solution is provided for security analysts to simplify the manual vetting task by automatically clustering the sandbox analysis reports 107 of the similar malware samples 110. The analyst can focus only on one event per cluster and quickly verify the correctness of the same decision for all the similar events in the same cluster.

Figure 7:
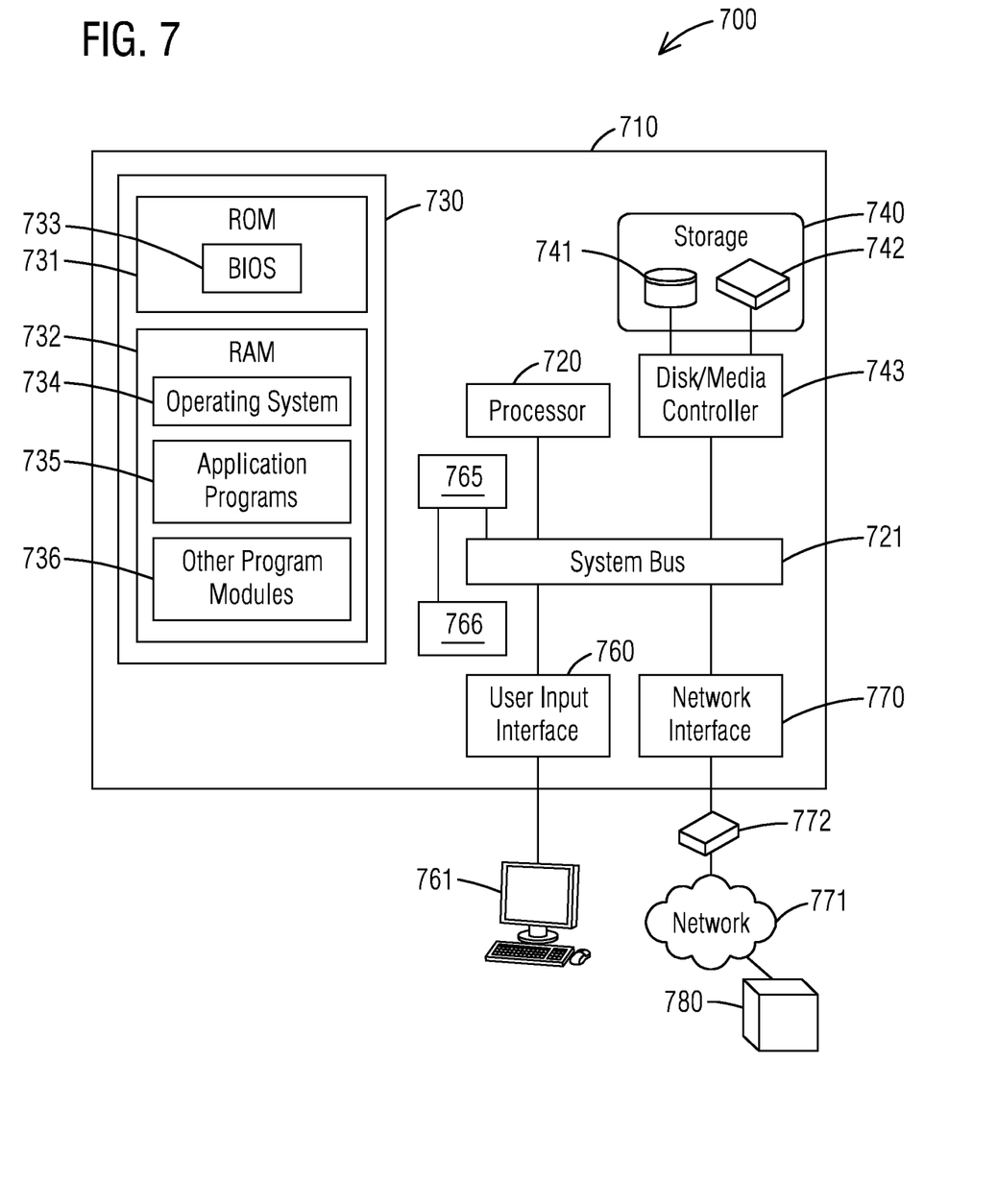
FIG. 7 shows an example of a computing environment within which embodiments of the disclosure may be implemented.

FIG. 7 shows an example of a computing environment 700 within which embodiments of the disclosure may be implemented. The computing environment 700 includes a computer system 710 that may include a communication mechanism such as a system bus 721 or other communication mechanism for communicating information within the computer system 710. The computer system 710 further includes one or more processors 720 coupled with the system bus 721 for processing the information.

The processors 720 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 720 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 721 may include at least one of a system bus, a memory bus, an address bus, or a message bus, and may permit exchange of information (e.g., data (including computer-executable code), signaling, etc.) between various components of the computer system 710. The system bus 721 may include, without limitation, a memory bus or a memory controller, a peripheral bus, an accelerated graphics port, and so forth. The system bus 721 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 710 may also include a system memory 730 coupled to the system bus 721 for storing information and instructions to be executed by processors 720. The system memory 730 may include computer readable storage media in the form of volatile and/or nonvolatile memory, such as read only memory (ROM) 731 and/or random access memory (RAM) 732. The RAM 732 may include other dynamic storage device(s) (e.g., dynamic RAM, static RAM, and synchronous DRAM). The ROM 731 may include other static storage device(s) (e.g., programmable ROM, erasable PROM, and electrically erasable PROM). In addition, the system memory 730 may be used for storing temporary variables or other intermediate information during the execution of instructions by the processors 720. A basic input/output system 733 (BIOS) containing the basic routines that help to transfer information between elements within computer system 710, such as during start-up, may be stored in the ROM 731. RAM 732 may contain data and/or program modules that are immediately accessible to and/or presently being operated on by the processors 720. System memory 730 may additionally include, for example, operating system 734, application programs 735, and other program modules 736. Application programs 735 may also include a user portal for development of the application program, allowing input parameters to be entered and modified as necessary.

The operating system 734 may be loaded into the memory 730 and may provide an interface between other application software executing on the computer system 710 and hardware resources of the computer system 710. More specifically, the operating system 734 may include a set of computer-executable instructions for managing hardware resources of the computer system 710 and for providing common services to other application programs (e.g., managing memory allocation among various application programs). In certain example embodiments, the operating system 734 may control execution of one or more of the program modules depicted as being stored in the data storage 740. The operating system 734 may include any operating system now known or which may be developed in the future including, but not limited to, any server operating system, any mainframe operating system, or any other proprietary or non-proprietary operating system.

The computer system 710 may also include a disk/media controller 743 coupled to the system bus 721 to control one or more storage devices for storing information and instructions, such as a magnetic hard disk 741 and/or a removable media drive 742 (e.g., floppy disk drive, compact disc drive, tape drive, flash drive, and/or solid state drive). Storage devices 740 may be added to the computer system 710 using an appropriate device interface (e.g., a small computer system interface (SCSI), integrated device electronics (IDE), Universal Serial Bus (USB), or FireWire). Storage devices 741, 742 may be external to the computer system 710.

The computer system 710 may also include a field device interface 765 coupled to the system bus 721 to control a field device 766, such as a device used in a production line. The computer system 710 may include a user input interface or GUI 761, which may comprise one or more input devices, such as a keyboard, touchscreen, tablet and/or a pointing device, for interacting with a computer user and providing information to the processors 720.

The computer system 710 may perform a portion or all of the processing steps of embodiments of the invention in response to the processors 720 executing one or more sequences of one or more instructions contained in a memory, such as the system memory 730. Such instructions may be read into the system memory 730 from another computer readable medium of storage 740, such as the magnetic hard disk 741 or the removable media drive 742. The magnetic hard disk 741 and/or removable media drive 742 may contain one or more data stores and data files used by embodiments of the present disclosure. The data store 740 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 720 may also be employed in a multi-processing arrangement to execute the one or more sequences of instructions contained in system memory 730. In alternative embodiments, hard-wired circuitry may be used in place of or in combination with software instructions. Thus, embodiments are not limited to any specific combination of hardware circuitry and software.

As stated above, the computer system 710 may include at least one computer readable medium or memory for holding instructions programmed according to embodiments of the invention and for containing data structures, tables, records, or other data described herein. The term "computer readable medium" as used herein refers to any medium that participates in providing instructions to the processors 720 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 741 or removable media drive 742. Non-limiting examples of volatile media include dynamic memory, such as system memory 730. Non-limiting examples of transmission media include coaxial cables, copper wire, and fiber optics, including the wires that make up the system bus 721. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 700 may further include the computer system 710 operating in a networked environment using logical connections to one or more remote computers, such as remote computing device 780. The network interface 770 may enable communication, for example, with other remote devices 780 or systems and/or the storage devices 741, 742 via the network 771. Remote computing device 780 may be a personal computer (laptop or desktop), a mobile device, a server, a router, a network PC, a peer device or other common network node, and typically includes many or all of the elements described above relative to computer system 710. When used in a networking environment, computer system 710 may include modem 772 for establishing communications over a network 771, such as the Internet. Modem 772 may be connected to system bus 721 via user network interface 770, or via another appropriate mechanism.

Network 771 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 710 and other computers (e.g., remote computing device 780). The network 771 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 771.

It should be appreciated that the program modules, applications, computer-executable instructions, code, or the like depicted in FIG. 7 as being stored in the system memory 730 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 710, the remote device 780, and/or hosted on other computing device(s) accessible via one or more of the network(s) 771, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the computer system 710 may include alternate and/or additional hardware, software, or firmware components beyond those described or depicted without departing from the scope of the disclosure. More particularly, it should be appreciated that software, firmware, or hardware components depicted as forming part of the computer system 710 are merely illustrative and that some components may not be present or additional components may be provided in various embodiments. While various illustrative program modules have been depicted and described as software modules stored in system memory 730, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While a servers-based architecture of an automated malware analysis system is described here a range of one or more other types of automated malware analysis systems or other forms of automated malware analysis systems are also contemplated by the present invention. For example, other types of automated malware analysis systems may be implemented based on one or more features presented above without deviating from the spirit of the present invention.

The techniques described herein can be particularly useful for automatically clustering sandbox analysis reports of similar malware samples based on GMM-based soft clustering of URLs. While particular embodiments are described in terms of the soft clustering of URLs, the techniques described herein are not limited to soft clustering of URLs but can also be used with other methods of clustering of URLs.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An automated malware analysis system for automatically clustering sandbox analysis reports of similar malware samples, comprising:
   a sandbox server including a first processor and a first memory, the first memory storing a sandbox virtual machine comprising software instructions when executed by the first processor to generate the sandbox analysis reports of the similar malware samples; and
   a clustering server including a second processor and a second memory, the second memory storing a Uniform Resource Locator (URL) categorizer comprising software instructions when executed by the second processor to cluster similar URLs together and the second memory further storing a report categorizer comprising software instructions when executed by the second processor to cluster the sandbox analysis reports of events based on the URL clustering performed by the URL categorizer, static properties of the malware samples and dynamic properties of the malware samples,
   wherein instead of combining all features together and running a single clustering algorithm clustering is a bi-level approach in which an output of a first level URL clustering is provided as an input or enrichment to a final event clustering,
   wherein the first level URL clustering uses intermediate features from an autoencoder NN as input to a Gaussian mixture model (GMM) such that the intermediate features are almost precise representations of actual URLs,
   wherein the URL is a component of an event which contains other static and dynamic malware features other than URLs,
   wherein the sandbox server comprises a first application programming interface (API) to receive a plurality of sandbox reports clusters from the clustering server, and
   wherein the clustering server comprises a second application programming interface (API) to receive the sandbox analysis reports from the sandbox server.

2. The system of claim 1, wherein the URL categorizer to soft cluster the similar URLs together using an auto encoder network-based feature extraction as input to a Gaussian mixture model (GMM).

3. The system of claim 2, wherein the report categorizer to cluster the sandbox analysis reports of events so that an analyst can focus only on one event per cluster and quickly verify correctness of a same decision for all similar events in a same cluster.

4. The system of claim 1, wherein the URL categorizer to soft cluster the similar URLs by performing text encoding.

5. The system of claim 4, wherein the URL categorizer to perform feature extraction after the text encoding.

6. The system of claim 5, the URL categorizer to perform a Gaussian mixture model (GMM) based soft clustering of the similar URLs after the feature extraction.

7. The system of claim 6, wherein the report categorizer to determine an event feature matrix from the clustered URLs.

8. The system of claim 7, wherein the report categorizer to determine a Gower's distance matrix from the event feature matrix.

9. The system of claim 8, wherein the report categorizer to perform a density-based spatial clustering after determining the Gower's distance matrix.

10. The system of claim 9, wherein the report categorizer to output a plurality of sandbox reports clusters.

11. A non-transitory computer readable medium comprising computer instructions capable of being executed in a processor of a clustering server of an automated malware analysis system, the computer instructions configured to:
   receive from a sandbox server sandbox analysis reports of similar malware samples at an application programming interface (API) of the clustering server for automatically clustering the sandbox analysis reports of the similar malware samples;

cluster similar Uniform Resource Locators (URLs) together;

cluster the sandbox analysis reports of events based on the URL clustering, static properties of the malware samples and dynamic properties of the malware samples; and send a plurality of sandbox reports clusters from the clustering server to the sandbox server so that an analyst can focus only on one event per cluster and quickly verify correctness of a same decision for all similar events in a same cluster, wherein instead of combining all features together and running a single clustering algorithm clustering is a bi-level approach in which an output of a first level URL clustering is provided as an input or enrichment to a final event clustering, wherein the first level URL clustering uses intermediate features from an autoencoder NN as input to a Gaussian mixture model (GMM) such that the intermediate features are almost precise representations of actual URLs, wherein the URL is a component of an event which contains other static and dynamic malware features other than URLs, wherein the sandbox server comprises a first application programming interface (API) to receive a plurality of sandbox reports clusters from the clustering server, and wherein the clustering server comprises a second application programming interface (API) to receive the sandbox analysis reports from the sandbox server.

12. The non-transitory computer readable medium according to claim 11, wherein the clustering similar Uniform Resource Locators (URLs) together comprises:

performing text encoding to soft cluster the similar URLs;
performing feature extraction after the text encoding; and
performing a Gaussian mixture model (GMM) based soft clustering of the similar URLs after the feature extraction.

13. The non-transitory computer readable medium according to claim 12, wherein the clustering the sandbox analysis reports of events comprises:

determining an event feature matrix from the clustered URLs;
determining a Gower's distance matrix from the event feature matrix; and
performing a density-based spatial clustering after determining the Gower's distance matrix.

14. The non-transitory computer readable medium according to claim 12, wherein the performing text encoding comprises:

given a URL, tokenizing the URL using a character dictionary such that this tokenization is used as input to an auto encoder network.

15. The non-transitory computer readable medium according to claim 12, wherein the performing feature extraction comprises:

extracting a features matrix.

16. The non-transitory computer readable medium according to claim 11, wherein the clustering the sandbox analysis reports of events comprises:

using the clustering of URLs as features for clustering the sandbox analysis reports.

17. The non-transitory computer readable medium according to claim 13, wherein the determining a Gower's distance matrix comprises:

using a Gower's distance for calculating the Gower's distance matrix.

18. The non-transitory computer readable medium according to claim 13, wherein the performing a density-based spatial clustering comprises:

determining final clustering of events using the density-based spatial clustering.

* * * * *